F. SLATTERY.
FARM GATE.
APPLICATION FILED SEPT. 8, 1910.
1,051,280.
Patented Jan. 21, 1913.
2 SHEETS—SHEET 2.
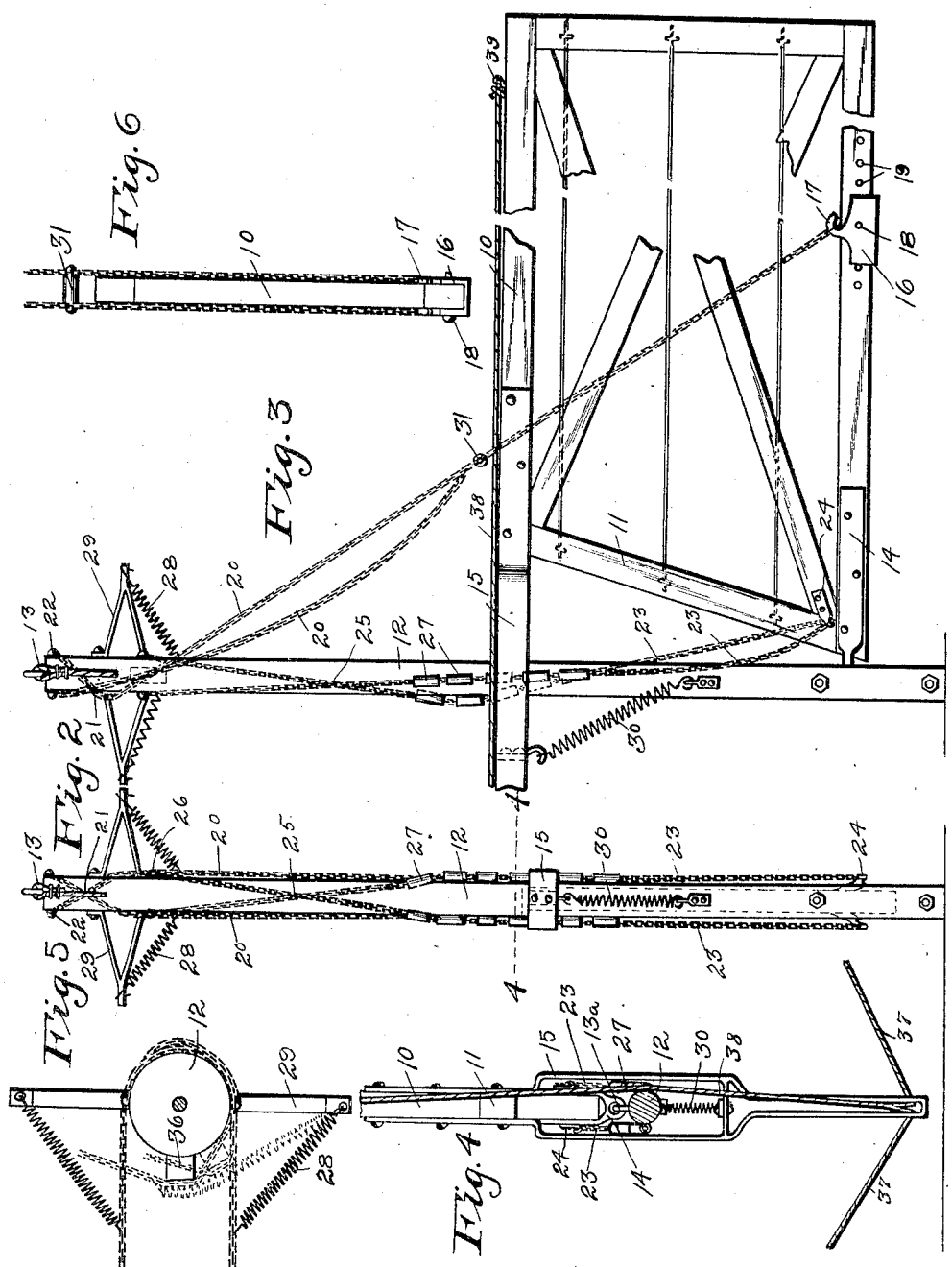
Witnesses
F. C. Caswell
U. A. Loftus.
Inventor
Frank Slattery
by J. Ralph Orwig Atty.

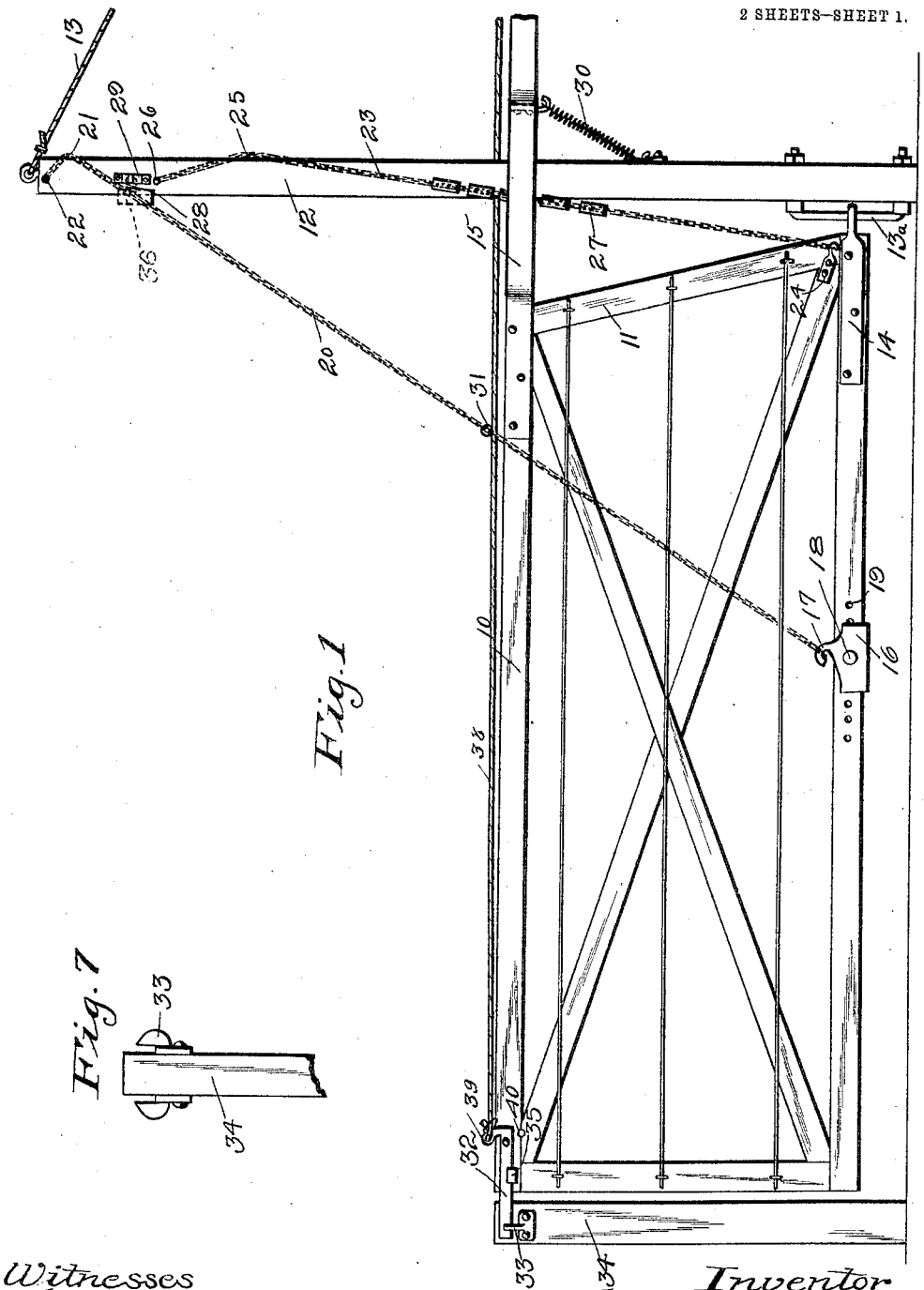

UNITED STATES PATENT OFFICE.

FRANK SLATTERY, OF PERRY, IOWA.

FARM-GATE.

1,051,280.  Specification of Letters Patent.  Patented Jan. 21, 1913.

Application filed September 8, 1910. Serial No. 581,087.

*To all whom it may concern:*

Be it known that I, FRANK SLATTERY, a citizen of the United States, residing at Perry, in the county of Dallas and State of Iowa, have invented a certain new and useful Farm-Gate, of which the following is a specification.

The object of my invention is to provide a farm gate of simple, durable and inexpensive construction designed to open both ways and to automatically close and lock itself after being opened.

A further object is to provide a gate with supports designed to be quickly and easily adjusted to raise and lower the gate frame, and also to provide means for opening the gate from a point away from the gate such, for instance, as a vehicle seat.

A further object is to provide a gate that, when shut, will rest comparatively near the ground and designed to rise bodily throughout as it is opened to pass above any obstruction in its path.

A further object is to provide a farm gate so arranged that the free end of the gate may, in any position of its travel, be raised to a position higher than the pivoted end to pass above a comparatively large obstruction.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of the gate in its closed position. Fig. 2 shows an end elevation of the gate in its closed position. Fig. 3 shows an end elevation of the gate opened. Fig. 4 shows a sectional view taken on the line 4—4 of Fig. 2. Fig. 5 shows a top view of the gate supporting post showing the adjustable means for causing the free end of the gate to rise also the springs for closing the gate. Fig. 6 shows a detail, end view of the gate showing same secured in an upright position by the supporting chains, and Fig. 7 shows a detail, end view of the post on which part of the locking device is mounted.

Referring to the accompanying drawings, the gate frame 10 is substantially rectangular except at one end, the end member 11 sloping inwardly as shown in Fig. 1. The gate frame 10 is pivotally and slidably mounted on the supporting post 12, which is braced by the guy wire 13 as follows: The rod 13ª set apart and extending parallel with the post is fixed to it and is designed to guide and form a bearing for the eye extension 14 fixed to the lower corner of the gate frame. Such a connection allows the gate to tilt and move upwardly and downwardly and also allows it to swing laterally at the top of the gate frame. The bar 15 extends from one side outwardly beyond the post and inwardly back to the gate frame, as shown in Fig. 4, forming a positive support for keeping the gate frame in an upright position.

The sliding shoe 16 mounted on the bottom member of the gate is provided with hooks 17 and a pin 18 designed to pass through openings in the shoe and through the holes 19 in the gate frame to secure different positions for same. Two chains 20 for supporting the free end of the gate frame 10 are fixed at one end to the hooks 17 on the shoe 16 and extend to the opposite sides of the post 12 near its top where they cross at 21, the other ends being fixed to the post at 22. Two chains 23 for supporting the pivoted end of the gate are detachably connected on opposite sides of the gate to the hooks 24 at one end and extend upwardly to opposite sides of the post 12 near its top where they cross at 25, the other ends being fixed at 26 to the post. With the gate frame mounted and supported in this manner it is obvious that when the gate is swung out of its normal position one of the chains 20 and 23 will wrap around the post thus raising the gate while the other one of the chains 20 and 23 will become slackened. I have provided pieces of pipe 27 at intervals on the chains 23 to prevent wear as the chains wrap around the post. When the gate is in its open position, as shown in Fig. 3 of the drawings, its weight will tend to unwrap the chains from the post and thus close the gate. I have formed means in this connection for quickly and positively closing the gate. Two springs 28 are fixed to the chains 20 at one end and at the other end to the outwardly extending brackets 29 on the post 12. When the gate is in either one of its open positions one of the springs 28 in under tension, as shown in Fig. 5, and will pull the gate shut with the aid of the chains as soon as it is released.

To keep the gate properly balanced and also to aid in shutting the gate a spring 30 is fastened at one end to a hook on the bar 15 and at the other end to a hook on the post 12, the tension of the spring 30 being adjusted as desired. A connecting link 31 is fixed to both the chains 20 above the gate and together with said chains form a support for the gate and hold it in an upright position. A latch 32 is pivotally mounted on the gate and extends outwardly beyond the end thereof and engages the catches 33 mounted on the fence post 34. The downward movement of the latch 32 is limited by the lug 35 on the gate frame 10. If it is desired to raise the outer end of the gate in any position of its travel a block 36 is fixed to the post 12 in the path of the chains 20 as shown in Fig. 5. It is obvious that when the gate is opened one of the chains 20 will pass over the block 36 and raise the end of the gate to a higher position than it would naturally reach if the block 36 was removed. The position of the block 36 is changed as desired to raise the end of the gate in any certain position of its travel.

For opening the gate from within a vehicle or the like, I have provided the following means: At the end of the bar 15 which is spaced apart and extends a considerable distance to the rear of the gate are two holes, one within each side piece of the bar; through these holes a rope 37 is passed, said rope being extended outwardly from the gate on both sides to a position within easy access of the operator. Secured to the rope 37 at a point between the side pieces of the bar 15 is another rope 38 extending longitudinally with the gate to the latch member 32 where it is fastened to an upwardly extending lug 39 on said latch. When the latch is in its closed position the rope 37 is drawn forwardly a short distance between the sides of the bar 15 by the rope 38. From this it will readily be seen that when the operator exerts a pull on either end of the rope 37 the rope 38 will be drawn rearwardly thus raising the latch until said latch reaches its limit of upward movement, said limit being when the short end of the latch strikes the pin 40 secured to the gate. The gate will next begin to swing, the bar 15 being pulled toward the operator thus swinging the gate open in the opposite direction. When the rope is released the gate will swing shut by the means hereinbefore described. The latch also drops down as the rope is released and when it engages the slanted side of the catch 33 it passes over said catch and drops into the notch therein thus firmly locking the gate.

In the practical operation of my gate, the operator first places the shoe 16 and the spring 30 in positions of their adjustment that allow the gate frame 10 to rest in a horizontal position as shown in Fig. 1 of the drawings. The latch 32 is then freed from engagement with the catch 33 by means of the ropes hereinbefore described and the gate is opened, causing one of the chains 20 and 23 to wrap around the post 12; thus raising the gate frame and causing one of the springs 28 and the spring 30 to become stretched out of their normal positions. The connecting link 31 keeps the slackened chain 20 tight to a position above the gate thus supporting it on both sides in an upright position. The operator then releases the rope and the tendency of the chains to unwrap, together with the action of the springs, close the gate, the latch 32 engaging one of the catches 33 as the gate reaches its normal position. If the operator desires to raise one end of the gate in a certain position of its travel the block 36 is fixed in the proper position. One of the chains 20 raises the end of the gate as it passes over the block on the post. The shoe 16 is adjusted laterally to obtain the proper height to which the gate is intended to rise, the spring 30 necessarily being adjusted to balance the gate as the position of the shoe 16 is changed.

I claim as my invention:

1. In a device of the class described, a supporting post, a gate pivotally and slidably mounted at its lower side on said post, ropes secured to each side of the end of the gate adjacent to the post near its lower edge and extending to the upper end of the post and around same, ropes secured on each side of the gate near its front end and extending to the upper end of said post and around same, said last named ropes being fastened together above said gate, oppositely extending brackets on said post, and springs secured to said brackets and to said last named ropes.

2. In a gate, the combination of a supporting post, a gate pivotally and slidingly mounted on the post, chains extending from opposite sides of the post and crossed at the back thereof, means for connecting said chains to the gate, chains extending from opposite sides of the post and crossed at the rear thereof, means for connecting said chains to the gate for supporting the gate when being opened, means on the chains for preventing wear on the post, and an adjustable spring for balancing the gate relative to the post.

3. In a gate, the combination of a supporting post, a gate frame slidingly and pivotally mounted on the post, chains extending from opposite sides of the post and crossed at the back thereof, means for connecting said chains to the gate, chains extending from opposite sides of the post and crossed at the rear thereof, means for connecting said chains to the gate, and adjustable means for changing the position of the connection between the first mentioned chains and the gate frame.

4. In a gate, the combination of a supporting post, a gate frame pivotally and slidingly mounted on the post, chains extending from opposite sides of the post, crossing at the back thereof and extending to opposite sides at the bottom of the gate at a point near its center, chains extending from opposite sides of the post crossing at the rear thereof and extending downwardly on corresponding sides of the gate frame to points near the lower rear corner thereof for supporting and elevating the gate when opening as described, means on the chains for preventing wear on the post, an adjustable spring for balancing the gate relative to the post, and a connecting link connecting said chains above the gate to hold it in an upright position.

5. In a farm gate, the combination of a supporting post, a rod extending parallel with the post, set apart therefrom and being fixed thereto, a gate frame, an eye extension mounted on the gate frame and engaging the rod, a bar fixed to the gate frame at the top extending rearwardly around the post, then forwardly to the gate for supporting it in an upright position, an adjustable shoe slidingly mounted on the bottom rail of the gate frame, provided with hooks, chains connected at one end to said hooks extending upwardly to corresponding sides of the post, crossing at the rear and extending to opposite sides of the post, hooks fixed on opposite sides to the lower rear corners of the gate frame, chains extending upwardly therefrom around the post to opposite sides thereof for supporting and raising the gate frame as described, brackets fixed on opposite sides of the post near its top, springs extending from said brackets to the first mentioned chains for closing the gate, and a spring fixed at one end to the top of the gate frame and at the other end to the post for balancing the gate.

6. In a farm gate, the combination of a supporting post, a rod extending parallel with the post, set apart therefrom and being fixed thereto, a gate frame, an eye extension mounted on the gate frame and engaging the rod, a bar fixed to the gate frame at the top extending rearwardly around the post, then forwardly to the gate for supporting it in an upright position, an adjustable shoe slidingly mounted on the bottom rail of the gate frame, provided with hooks, chains connected at one end to said hooks extending upwardly to corresponding sides of the post, crossing at the rear and extending to opposite sides of the post, hooks fixed on opposite sides to the lower rear corners of the gate frame, chains extending upwardly therefrom around the post to opposite sides thereof for supporting and raising the gate frame as described, brackets fixed on opposite sides of the post near its top, springs extending from said brackets to the first mentioned chains, for closing the gate, and a spring fixed at one end to the top of the gate frame and at the other end to the post for balancing the gate, and a series of casings on the chains to prevent wear on the post.

7. In a farm gate, the combination of a supporting post, a rod extending parallel with the post, set apart therefrom and being fixed thereto, a gate frame, an eye extension mounted on the gate frame and engaging the rod, a bar fixed to the gate frame at the top extending rearwardly around the post, then forwardly to the gate for supporting it in an upright position, an adjustable shoe slidingly mounted on the bottom rail of the gate frame provided with hooks, chains connected at one end to said hooks extending upwardly to corresponding sides of the post, crossing at the rear and extending to opposite sides of the post, hooks fixed on opposite sides to the lower rear corners of the gate frame, chains extending upwardly therefrom around the post to opposite sides thereof for supporting and raising the gate frame as described, brackets fixed on opposite sides of the post near its top, chains extending from said brackets to the first mentioned chains for closing the gate, a spring fixed at one end to the top of the gate frame and at the other end to the post for balancing the gate, a series of casings on the chains to prevent wear on the post, and a link connecting the first mentioned chains to form a support for the gate frame.

8. In a farm gate, the combination of a supporting post, a rod extending parallel with the post, set apart therefrom and being fixed thereto, a gate frame, an eye extension mounted on the gate frame and engaging the rod, a bar fixed to the gate frame at the top extending rearwardly around the post, then forwardly to the gate for supporting it in an upright position, means for opening the gate from a point spaced apart therefrom, an adjustable shoe slidingly mounted on the bottom rail of the gate frame provided with hooks, chains connected at one end to said hooks extending upwardly to corresponding sides of the post, crossing at the rear and extending to opposite sides of the post, hooks fixed on opposite sides to the lower rear corners of the gate frame, chains extending upwardly therefrom around the post to opposite sides thereof for supporting and raising the gate frame as described, brackets fixed on opposite sides of the post near its top, chains extending from said brackets to the first mentioned chains for closing the gate, a spring fixed at one end to the top of the gate frame and at the other end to the post for balancing the gate, a series of casings on the chains to prevent wear on the post, a link connecting the first mentioned chains to form a support for the gate frame, and an adjustable block in the path of the first mentioned chains for raising the outer end of said gate frame.

Des Moines, Iowa, July 29, 1910.

FRANK SLATTERY.

Witnesses:
E. N. CHILDS,
A. W. HEISS.

Copies of this patent may be obtained for five cents each, by addressing the "Commissioner of Patents, Washington, D. C."